(12) United States Patent
Bingo et al.

(10) Patent No.: US 11,453,371 B2
(45) Date of Patent: Sep. 27, 2022

(54) VEHICLE

(71) Applicant: TOYOTA JIDOSHA KABUSHIKI KAISHA, Toyota (JP)

(72) Inventors: Mizuki Bingo, Toyota (JP); Takeshi Kuwahara, Toyota (JP); Kazuki Iwakura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 390 days.

(21) Appl. No.: 16/858,645

(22) Filed: Apr. 26, 2020

(65) Prior Publication Data
US 2020/0339077 A1 Oct. 29, 2020

(30) Foreign Application Priority Data
Apr. 26, 2019 (JP) .............................. JP2019-086754

(51) Int. Cl.
| *F16H 57/025* | (2012.01) |
| *B60T 1/00* | (2006.01) |
| *B60K 17/04* | (2006.01) |
| *B60K 5/04* | (2006.01) |

(52) U.S. Cl.
CPC .............. *B60T 1/005* (2013.01); *B60K 17/04* (2013.01); *F16H 57/025* (2013.01); *B60K 5/04* (2013.01)

(58) Field of Classification Search
CPC .... F16H 57/025; F16H 57/02; F16H 63/3458; F16H 2057/02043; B60T 1/005; B60T 1/062; B60K 17/04; B60K 5/04; B60K 6/383; B60K 6/405; B60K 6/445; B60K 17/16; F16D 63/006
See application file for complete search history.

(56) References Cited

U.S. PATENT DOCUMENTS

| 2016/0091079 A1* | 3/2016 | Compton | .............. F16H 57/025 248/674 |
| 2019/0249761 A1* | 8/2019 | Compton | .............. F16M 13/022 |

FOREIGN PATENT DOCUMENTS

JP 2013-167289 A 8/2013

* cited by examiner

*Primary Examiner* — David J Hlavka
(74) *Attorney, Agent, or Firm* — Hunton Andrews Kurth LLP

(57) ABSTRACT

A vehicle including: (i) a drive-force transmission unit including a casing and installed in a offset position that is offset from a widthwise center of the vehicle in an offset direction; (ii) a component protruding away from the casing toward a front side of the vehicle, and including first and second region portions such that the first region portion is located on a front side of the second region portion in the offset direction; and (iii) an attachment member through which the component is attached to a vehicle-front side portion of the casing. The attachment member is provided with a displacement adjustment portion that is configured, upon application of an external force to the component from the front side of the vehicle, to facilitate the first region portion of the component to be displaced toward a rear side of the vehicle, more than the second region portion of the component.

12 Claims, 7 Drawing Sheets

VEHICLE

This application claims priority from Japanese Patent Application No. 2019-086754 filed on Apr. 26, 2019, the disclosure of which is herein incorporated by reference in its entirety.

FIELD OF THE INVENTION

The present invention relates to a vehicle including a drive-force transmission unit and a component, wherein the drive-force transmission unit is installed in a widthwise offset position which is located in a front portion of the vehicle and which is offset from a widthwise center of the vehicle, and wherein the component is fixedly provided on a front side of the drive-force transmission unit.

BACKGROUND OF THE INVENTION

There is known a vehicle including a drive-force transmission unit having a casing storing therein a drive-force transmission mechanism, and a component attached to a vehicle-front side portion of the casing and protruding from the casing toward a front side of the vehicle. JP-2013-167289A discloses an example of such a vehicle. In the vehicle disclosed in the Japanese Patent Application Publication, a transaxle as the drive-force transmission unit is provided, and an actuator device as the component is attached to the vehicle-front side portion of the casing of the transaxle, wherein the actuator device is configured to electrically actuate a parking lock mechanism.

SUMMARY OF THE INVENTION

In the vehicle as described above, where the drive-force transmission unit is installed in a widthwise offset position that is offset from a widthwise center of the vehicle in an offset direction that is one of right and left directions of the vehicle, when an impact load is applied from a front side of the vehicle to the drive-force transmission unit through the component, a pressing load is applied to the vehicle such that the pressing load acts in a direction opposite to the offset direction, i.e., in a direction away from a collision object, due to the arrangement in which the drive-force transmission unit is installed in the widthwise offset position. FIG. 12 is a schematic plan view of a front portion of a vehicle 200 as seen from an upper side of the vehicle 200, and shows a case in which the vehicle 200 is offset-collided at its right-side portion with a collision object W. As shown in FIG. 12, when an impact load Fa is applied from a front side (i.e., lower side as seen in FIG. 12) of the vehicle 200 through a bumper or the like to a component 204 such as an actuator device attached to a drive-force transmission unit 202 such as a transaxle, the impact load Fa acts as a transmission load Fb on the drive-force transmission unit 202, and a pressing load F acts on the vehicle 200 through a body 206 such as a side member supporting the drive-force transmission unit 202. In this instance, since the drive-force transmission unit 202 is installed in the widthwise offset position that is offset from the widthwise center of the vehicle 200 in the right direction of the vehicle 200, the pressing load Fc acts in a direction inclined toward the left direction of the vehicle 200 away from the collision object W. Thus, with the pressing load Fc acting in the direction away from the collision object W, the vehicle 200 (to which the pressing load Fc is applied) is laterally moved in a direction away from the collision object W (i.e., in left direction as seen in FIG. 12), so that an impact acing in the vehicle 200 is alleviated owing to the lateral movement of the vehicle 200. However, more alleviation of the impact is required to increase safety of passengers 208 of the vehicle 200. In the following descriptions in the present specification, right and left directions of the vehicle are directions as seen from the front side of the vehicle, rather than being directions as seen from a rear side of the vehicle.

The present invention was made in view of the background art described above. It is therefore an object of the present invention to provide a vehicle including a drive-force transmission unit installed in a widthwise offset position that is offset from a widthwise center of the vehicle, wherein the vehicle is capable of further alleviating an impact acting on the vehicle when an impact load is applied from a front side of the vehicle to a component provided on a front side of the drive-force transmission unit.

The above-described object indicated above is achieved according to the following aspects of the present invention.

According to a first aspect of the invention, there is provided a vehicle comprising: a drive-force transmission mechanism; a drive-force transmission unit including a casing storing therein the drive-force transmission mechanism, the drive-force transmission unit being installed in a widthwise offset position which is located in a front portion of the vehicle and which is offset from a widthwise center of the vehicle in an offset direction that is one of right and left directions of the vehicle; a component disposed on a front side of the casing in a longitudinal direction of the vehicle and protruding away from the casing toward a front side of the vehicle, the component including first and second region portions that are opposite to each other in a width direction of the vehicle such that the first region portion is located on a front side of the second region portion in the offset direction; and an attachment member through which the component is attached to a vehicle-front side portion of the casing, wherein the improvement is that the attachment member is provided with a displacement adjustment portion that is configured, upon application of an external force to the component from the front side of the vehicle, to facilitate the first region portion of the component to be displaced toward a rear side of the vehicle, more than the second region portion of the component, or alternatively, the improvement is that the attachment member includes opposite end portions that are opposite to each other in the width direction of the vehicle, such that one of the opposite end portions is located on a front side of the other of the opposite end portions in the offset direction, wherein, upon the application of the external force to the component from the front side of the vehicle, the attachment member is to be compressively deformed in the longitudinal direction of the vehicle by a larger amount in the one of the opposite end portions, than in the other of the opposite end portions. The term "compressive deformation" is interpreted to encompass buckling of the attachment member. Further, for example, the component and the casing have respective surfaces that are opposed to each other and distant from each other in the longitudinal direction of the vehicle, wherein the surfaces of the component and the casing have respective overlapping portions that overlap with the attachment member in the longitudinal direction of the vehicle, wherein each of the overlapping portions of the surfaces of the component and the casing includes opposite end portions that are opposite to each other in the width direction of the vehicle, such that one of the opposite end portions is located on a front side of the other of the opposite end portions in the offset direction, wherein a distance between the overlapping portions in the longitudinal direction of the vehicle is larger in the one of the opposite end portions, than in the other of the opposite end portions, and wherein the attachment member has a smaller rigidity against the external force applied to the component from the front side of the vehicle, than the casing.

According to a second aspect of the invention, in the vehicle according to the first aspect of the invention, the attachment member is a single piece made of a metallic material, wherein the displacement adjustment portion of the attachment member has a shape that facilitates the first region portion of the component to be displaced toward the rear side of the vehicle, more than the second region portion of the component, upon the application of the external force to the component from the front side of the vehicle.

According to a third aspect of the invention, in the vehicle according to the first or second aspect of the invention, the attachment member includes at least one fixed portion at which the attachment member is fixed to the casing, wherein the attachment member includes a plurality of attached portions to which the component is attached, wherein the plurality of attached portions include at least one first attached portion and at least one second attached portion such that the at least one first attached portion is located on a front side of the at least one second attached portion in the offset direction, and wherein the at least one first attached portion is facilitated, by the displacement adjustment portion, to be displaced toward the rear side of the vehicle, more than the at least one second attached portion, upon the application of the external force to the component from the front side of the vehicle.

According to a fourth aspect of the invention, in the vehicle according to the third aspect of the invention, each of the at least one first attached portion of the attachment member is distant from the casing of the drive-force transmission unit by a first distance in the longitudinal direction of the vehicle, and each of the at least one second attached portion of the attachment member is distant from the casing of the drive-force transmission unit by a second distance in the longitudinal direction of the vehicle, wherein the first distance is larger than the second distance, whereby the at least one first attached portion is permitted to be displaced toward the rear side of the vehicle by a distance larger than the at least one second attached portion, upon the application of the external force to the component from the front side of the vehicle.

According to a fifth aspect of the invention, in the vehicle according to the third or fourth aspect of the invention, the attachment member includes at least one protruding support portion having a plate-like shape and protruding toward the front side of the vehicle, wherein each of the at least one first attached portion is provided in a distal end portion of a corresponding one of the at least one protruding support portion, and wherein the at least one protruding support portion constitutes at least a part of the displacement adjustment portion of the attachment member.

According to a sixth aspect of the invention, in the vehicle according to the third or fourth aspect of the invention, the attachment member includes at least one cantilever support portion extending in the offset direction, wherein each of the at least one first attached portion is provided in a distal end portion of a corresponding one of the at least one cantilever support portion, and wherein the at least one cantilever support portion constitutes at least a part of the displacement adjustment portion of the attachment member.

According to a seventh aspect of the invention, in the vehicle according to any one of the third through sixth aspects of the invention, the at least one fixed portion of the attachment member consists of a plurality of fixed portions, wherein a center of the plurality of attached portions is located on a front side of a center of the plurality of fixed portions in the offset direction. The center of the plurality of attached portions corresponds to a center of gravity of a plate member which has a shape defined by connecting the plurality of attached portions and which is made of a homogeneous material. For example, where the plurality of attached portions consist of three attached portions, the center of the three attached portions corresponds to an intersection of medians of a triangle defined by connecting the three attached portions. The same descriptions are applied to the center of the plurality of fixed portions.

According to an eighth aspect of the invention, in the vehicle according to any one of the first through seventh aspects of the invention, the component is attached to the casing of the drive-force transmission unit through the attachment member such that the component is located in an offset position relative to the drive-force transmission unit, the offset position being offset from a center of the drive-force transmission unit in the offset direction.

According to a ninth aspect of the invention, in the vehicle according to any one of the first through eighth aspects of the invention, the drive-force transmission unit is a transaxle which is disposed to be adjacent to a drive force source in the width direction of the vehicle, the transaxle being provided with, as at least a part of the drive-force transmission mechanism, a differential device configured to distribute a drive force transmitted from the drive force source, into right and left wheels of the vehicle, wherein the component is an actuator device configured to electrically actuate a parking lock mechanism for mechanically inhibiting rotation of a drive-force transmitting member that constitutes at least a part of the drive-force transmission mechanism.

In the vehicle according to the first aspect of the invention, the component is attached to the casing of the drive-force transmission unit through the attachment member, and the attachment member is provided with the displacement adjustment portion that is configured to facilitate the first region portion of the component to be displaced toward a rear side of the vehicle, more than the second region portion of the component. Therefore, when an impact load as the external force is applied to the component from the front side of the vehicle, for example, in the event of an offset collision, an attitude of the component is changed such that the first region portion of the component becomes close to the casing, as a result of, for example, deformation or breakage of the displacement adjustment portion. Owing to the change of the attitude of the component, a transmission load acting in a direction inclined toward an opposite direction opposite to the above-described offset direction in which the widthwise offset position of the transaxle is offset from the widthwise center of the vehicle, is applied to the drive-force transmission unit whereby a pressing load acting in a direction that is inclined toward the opposite direction more than conventionally, is applied to the vehicle. Owing to application of the pressing load acting in the direction more inclined toward the opposite direction, the vehicle is moved more appropriately in a direction away from the collision object, it is possible to further alleviate an impact applied to the vehicle and accordingly to increase safety of passengers of the vehicle.

In the vehicle according to the second aspect of the invention, the first region portion of the component is facilitated, by the shape of the displacement adjustment portion of the attachment member, to be appropriately displaced toward the rear side of the vehicle, more than the second region portion of the component, as a result of deformation or breakage of the displacement adjustment portion, upon application of the external force to the component from the front side of the vehicle. Further, since the attachment member is constituted by a single piece made of a metallic material, the attachment member can be made compact in size and light in weight at a low cost.

In the vehicle according to the third aspect of the invention, the at least one first attached portion, which is located on the front side of the at least one second attached portion in the offset direction, is facilitated, by the displacement adjustment portion, to be displaced toward the rear side of the vehicle, more than the at least one second attached portion, so that the attitude of the component is appropriately changed such that the first region portion of the component becomes close to the casing, as a result of the displacement of the at least one first attached portion caused by, for example, deformation or breakage of the displacement adjustment portion.

In the vehicle according to the fourth aspect of the invention, the first distance between each of the at least one first attached portion of the attachment member and the casing of the drive-force transmission unit in the longitudinal direction of the vehicle is larger than the second distance between each of the at least one second attached portion of the attachment member and the casing of the drive-force transmission unit in the longitudinal direction of the vehicle, so that the at least one first attached portion can be appropriately displaced toward the rear side of the vehicle by a distance larger than the at least one second attached portion.

In the vehicle according to the fifth aspect of the invention, each of the at least one first attached portion is provided in the distal end portion of a corresponding one of the at least one protruding support portion having the plate-like shape and protruding toward the front side of the vehicle, and each of the at least one protruding support portion constitutes at least a part of the displacement adjustment portion of the attachment member, so that the at least one first attached portion can be appropriately displaced toward the rear side of the vehicle by a distance larger than the at least one second attached portion, owing to, for example, deformation (e.g., buckling) and breakage of the at least one protruding support portion.

In the vehicle according to the sixth aspect of the invention, each of the at least one first attached portion is provided in a distal end portion of a corresponding one of the at least one cantilever support portion extending in the above-described offset direction in which the widthwise offset position of the transaxle is offset from the widthwise center of the vehicle, and each of the at least one cantilever support portion constitutes at least a part of the displacement adjustment portion of the attachment member, so that the at least one first attached portion can be appropriately displaced toward the rear side of the vehicle by a distance larger than the at least one second attached portion, owing to, for example, deformation (e.g., bending) and breakage of the at least one cantilever support portion.

In the vehicle according to the seventh aspect of the invention, the center of the plurality of attached portions is located on a front side of the center of the plurality of fixed portions in the above-described offset direction in which the widthwise offset position of the transaxle is offset from the widthwise center of the vehicle, so that the component is supported by the attachment member in an unstable manner. Therefore, upon application of the external force to the component from the front side of the vehicle, the at least one first attached portion can be appropriately displaced toward the rear side of the vehicle, owing to, for example, deformation and/or breakage of the attachment member.

In the vehicle according to the eighth aspect of the invention, the component is attached to the casing of the drive-force transmission unit through the attachment member such that the component is located in the offset position relative to the drive-force transmission unit, wherein the offset position is offset from the center of the drive-force transmission unit in the offset direction, so that the transmission load applied to the drive-force transmission unit is inclined more toward the above-described opposite direction, owing to the offset location of the component relative to the drive-force transmission unit in addition to the change of the attitude of the component. Therefore, the pressing load applied to the vehicle from the drive-force transmission unit is inclined more toward the above-described opposite direction, whereby the impact acting on the vehicle can be further appropriately alleviated and accordingly the safety can be further increased.

In the vehicle according to the ninth aspect of the invention, the drive-force transmission unit is the transaxle, and the actuator device of the parking lock mechanism is the component that is attached to the casing of the transaxle through the attachment member. In the event of the offset collision, for example, the attitude of the actuator device is changed owing to, for example, deformation of the attachment member, so that it is possible to appropriately provide technical advantages that the impact acting on the vehicle can be alleviated and accordingly the safety can be increased.

DETAILED DESCRIPTION OF PREFERRED EMBODIMENT

Figure 1:
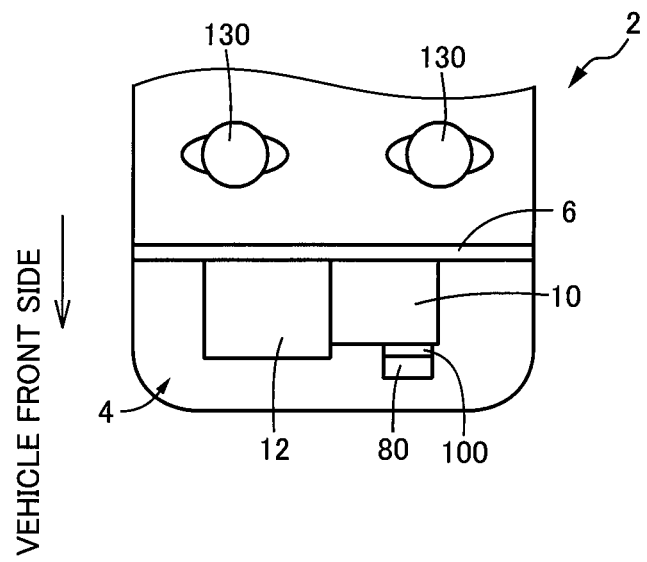
FIG. 1 is a schematic upper plan view showing a front portion of a vehicle according to an embodiment of the present invention, for explaining a transaxle and other components provided in an engine room of the vehicle.

The present invention is applicable to various types of vehicles such as an engine-drive vehicle including an engine (internal combustion engine) as the drive force source, a hybrid vehicle including the engine and an electric motor as the drive force sources and an electric vehicle including only the electric motor as the drive force source. The drive-force transmission unit is, for example, a transaxle configured to distribute a drive force transmitted from the drive force source, to right and left wheels of the vehicle. However, the drive-force transmission unit may be also a transmission such as an automatic transmission and a manual transmission. Within the casing of the drive-force transmission unit, the drive force source such as the engine and the electric motor may be disposed as needed. Further, where the vehicle is the electric vehicle, the drive-force transmission unit may be an electric drive device in which the drive-force transmission mechanism and the electric motor are both disposed within the casing that is common to the drive-force transmission mechanism and the electric motor. The drive-force transmission unit is installed in the widthwise offset position that is offset from the widthwise center of the vehicle in the offset direction, wherein the offset direction may be either the right or left direction of the vehicle.

Although the casing of the drive-force transmission unit may be constituted by a single member, the casing may be constituted also by a plurality of casing members as needed. The component, which is provided on the front side of the casing of the drive-force transmission unit, may be any one of various kinds of components that are to be installed in the vehicle, such as an actuator of a SBW (Shift-By-Wire) device configured to electrically switch a drive-force transmitting state of the drive-force transmission mechanism in response to operation of an operating member such as a shift lever, an electronic control device configured to control the actuator, an electronic control device such as a PCU (Power Control Unit) configured to electrically control an output of the drive force source for driving the vehicle, and a valve body included in a hydraulic control system. It is preferable that the component has a higher rigidity against the external force (e.g., impact load) applied from the front side of the vehicle, as compared with a rigidity of the displacement adjustment portion of the attachment member, so that the displacement adjustment portion is deformed or damaged before the component is deformed or damaged. However, the component may be deformed or damaged before the displacement adjustment portion is deformed or damaged.

It is preferable that an entirety of the attachment member including the displacement adjustment portion constituted by the attached and fixed portions is constituted by a single piece (single member) made of a metallic material, and is formed to have a shape by casting, die-casting or pressing process. However, the attachment member may be constituted by a plurality of pieces made of metallic materials that may be either the same as each other or different from each other. Further, the attachment member may be made of material other than a metallic material. Where the attachment member is constituted by a single piece, with each of the at least one attached portion being provided with an internally threaded hole in which a fixture bolt is to be in thread engagement for attaching the component to the at least one attached portion, each of the at least one attached portion may be provided with a thick portion defining the internally threaded hole. However, each of the at least one attached portion may be provided with a nut that is fixed therein by welding or the like, in place of provision of the thick portion defining the internally threaded hole. The attachment member is fixed at the at least one fixed portion thereof to the casing of the drive-force transmission unit, for example, through a fastener such as a screw bolt. However, the attachment member may be fixed to the casing through other fixing means such as welding. Similarly, the component is attached to the at least one attached portion of the attachment member, for example, through a fastener such as a screw bolt. However, the component may be attached to the attachment member through other fixing means such as welding. The at least one attached portion may consist of a plurality of attached portions that are distant from each other in the width direction of the vehicle, for example. However, the at least one attached portion may consist of a single attached portion by which the component is supported, such that an attitude of the component is changeable by deformation or breakage of the attached portion when the external force is applied to the component.

The displacement adjustment portion is provided, for example, to appropriately assure an amount of displacement of the at least one first attached portion toward the rear side of the vehicle. That is, the displacement adjustment portion is to be deformed or broken, upon application of the external force to the component from the front side of the vehicle, so as to allow the displacement of the at least one first attached portion, and is capable of causing the at least one first attached portion to be displaced appropriately, owing to a shape and/or a rigidity of the displacement adjustment portion that is suitably determined or adjusted. The rigidity of the displacement adjustment portion can be adjusted, for example, by changing a thickness and/or a width, and also by changing a support structure such as a cantilever support structure. Where the attachment member is constituted by a plurality of pieces (a plurality of members), the displacement adjustment portion may be constituted by a relatively low rigidity piece, or may be constituted by a connecting portion that connects between the plurality of pieces or is fixed to the plurality of pieces, such that the at least one first attached portion is to be displaced by breakage, deformation and/or relative displacement of the connecting portion. The at least one second attached portion may be displaced concurrently with displacement of the at least one first attached portion, upon application of the external force to the component from the front side of the vehicle, as long as the at least one first attached portion is displaced by a distance larger than the at least one second attached portion whereby the attitude of the component relative to the drive-force transmission unit is changeable. Although the displacement adjustment portion is constituted by, for example, a portion supporting the at least one first attached portion, the displacement adjustment portion may be constituted alternatively by a portion located in the vicinity of the at least one fixed portion.

The first distance by which each of the at least one first attached portion of the attachment member is distant from the casing may be larger than the second distance by which each of the at least one second attached portion of the attachment member is distant from the casing, whereby the at least one first attached portion is permitted to be displaced toward the rear side of the vehicle by a distance larger than the at least one second attached portion. However, the first distance does not necessarily have to be larger than the second distance, and the first and second distances may be substantially equal to each other, for example. The at least one first attached portion can be displaced toward the rear side of the vehicle by a distance larger than the at least one second attached portion, for example, in an arrangement in which a portion of the attachment member supporting the at least one first attached portion has a lower rigidity against the external force applied to the component from the front side of the vehicle, than a portion of the attachment member supporting the at least one second attached portion. The attached portions may be provided with respective seat surfaces that are opposed to the front side of the vehicle, such that the component is attached to the attached portions from the front side of the vehicle, with the component being in close contact with the seat surfaces of the attached portions. The seat surfaces of the respective attached portions do not necessarily have to be surfaces perpendicular to the longitudinal direction of the vehicle, and may be surfaces inclined with respect to a vertical direction of the vehicle and/or in the width direction of the vehicle. Further, each of the attached portions may be a device configured to sandwich the component from upper and lower sides of the vehicle or from the right and left sides of the vehicle.

Where the at least one fixed portion of the attachment member consists of a plurality of fixed portions, it is preferable that the center of the plurality of attached portions is located on a front side of the center of the plurality of fixed portions in the above-described offset direction in which the widthwise offset position of the drive-force transmission unit is offset from the widthwise center of the vehicle. However, even where the center of the plurality of attached portions and the center of the plurality of fixed portions are in substantially the same position in the width direction of the vehicle, it is possible to cause the at least one first attached portion to be displaced toward the rear side of the vehicle by a distance larger than the at least one second attached portion, for example, by suitably determining or adjusting the shape and/or rigidity of the displacement adjustment portion. Further, even in an arrangement in which the at least one fixed portion consists of a single fixed portion and the at least one attached portion consists of a single attached portion (so that the attachment member is fixed at the single fixed portion to the casing of the drive-force transmission unit and the component is attached to the single attached portion of the attachment member), it is possible to facilitate the attitude of the component to be changed, upon application of the external force to the component from the front side of the vehicle, such that the at least one first attached portion is displaced toward the rear side of the vehicle by a distance larger than the at least one second attached portion, for example, by providing the single attached portion in a position located on a front side of a position of the single fixed portion in the above-described offset position.

It is preferable that the component, which is attached to the casing through the attachment member, is disposed in a position that is offset from a widthwise center of the casing in the above-described offset direction in which the widthwise offset position of the drive-force transmission unit is offset from the widthwise center of the vehicle. However, the component may be disposed in a position that is not substantially offset from the widthwise center of the casing, namely, the component may be attached to the vicinity of the widthwise center of the casing through the attachment member. Further, the present invention is applicable also to an arrangement in which the component attached to the casing through the attachment member is disposed in a position that is offset from the widthwise center of the casing in a direction opposite to the above-described offset direction in which the widthwise offset position of the drive-force transmission unite is offset from the widthwise center of the vehicle.

Embodiment

Hereinafter, a preferred embodiment of the invention will be described in detail with reference to the accompanying drawings. The figures of the drawings are simplified or deformed as needed, and each portion is not necessarily precisely depicted in terms of dimension ratio, shape, etc.

FIG. 1 is a schematic upper plan view showing a front portion of a vehicle 2 according to an embodiment of the present invention, for explaining a positional relationship among a transaxle 10 and other components provided in an engine room 4 of the vehicle 2. The vehicle 2 of the present embodiment is an engine-drive vehicle of FF (front engine/front drive) system provided with an engine 12 as the drive force source. In the vehicle 2, the transaxle 10 as well as the engine 12 is disposed in a lateral attitude within an engine room 4 as a drive-force source room such that rotary shafts of the transaxle 10 are substantially parallel to a width direction of the vehicle 2. The transaxle 10 is attached to a body 6 such as a cross member through support members such as rubber mounts. The engine 12 is an internal combustion engine such as a gasoline engine or a diesel engine, which is configured to generate a drive force by combustion of a fuel. The transaxle 10 is integrally fixed to the engine 12, with the transaxle 10 being adjacent to the engine 12, and with the transaxle 10 being disposed on a right side of the engine 12 in the width direction of the vehicle 2 (hereinafter simply referred to as "vehicle width direction"). That is, as shown in FIG. 1, the transaxle 10 is installed in a widthwise offset position that is offset from a widthwise center of the vehicle 2 in an offset direction, which is a right direction of the vehicle 2 in the present embodiment. In the following descriptions regarding the present embodiment, the right and left directions of the vehicle 2, which are parallel to the vehicle width direction, are directions as seen in a front view of the vehicle 2, i.e., as seen from a front side of the vehicle 2, rather than being directions as seen in a rear view of the vehicle 2, i.e., as seen from a rear side of the vehicle 2. That is, the offset direction in which the widthwise offset position of the transaxle 10 is offset from the widthwise center of the vehicle 2, is the right direction in the present embodiment.

Figure 10:
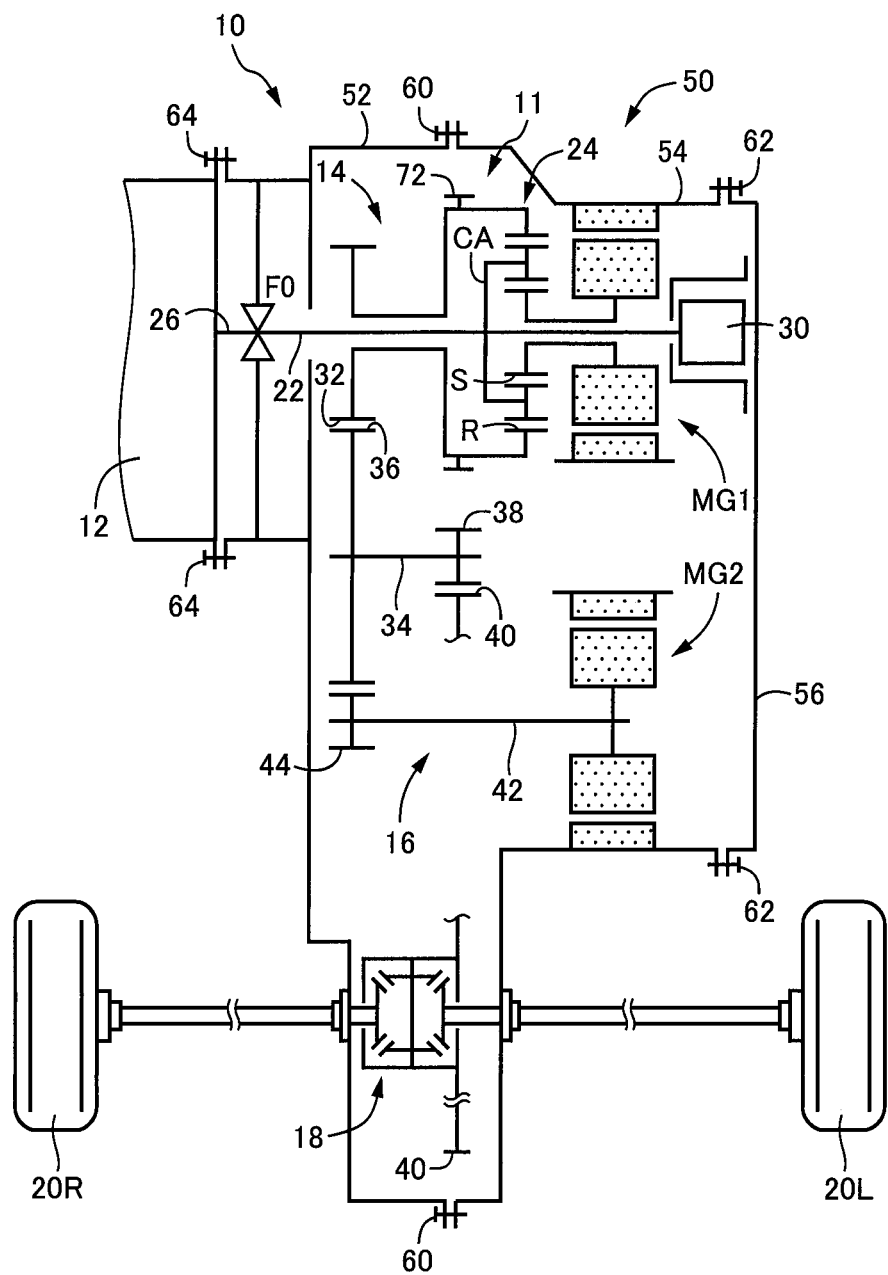
FIG. 10 is a view for specifically explaining of an example of a drive-force transmission mechanism of the transaxle.

FIG. 10 is a view for specifically explaining of an example of the transaxle 10, which includes a drive-force transmission mechanism 11 and a transaxle casing 50 storing therein the drive-force transmission mechanism 11. The drive-force transmission mechanism 11 is constituted by a first driving portion 14, a second driving portion 16 and a differential device 18 that are stored in the transaxle casing 50. The first driving portion 14 is constituted mainly by a planetary gear device 24 and a first rotary machine MG1. The planetary gear device 24 includes three rotary elements in the form of a sun gear S, a carrier CA and a ring gear R. The first rotary machine MG1 is connected to the sun gear S of the planetary gear device 24. The planetary gear device 24 and the first rotary machine MG1 are disposed on a common axis that is parallel to the vehicle width direction. Although the first rotary machine MG1 may be a generator, the first rotary machine MG1 is preferably a motor/generator that serves as either an electric motor or a generator. A crank shaft 26 of the engine 12 is connected to the carrier CA of the planetary gear device 24 through an input shaft 22 of the first driving portion 14. The ring gear R of the planetary gear device 24 is connected to a first output gear 32 as an output rotary member. The first output gear 32 meshes with a large diameter gear 36 that is disposed on a counter shaft 34 that is parallel to the input shaft 22, and a small diameter gear 38 disposed on the counter gear 34 meshes with a ring gear 40 of the differential device 18, so that the drive force of the engine 12 is transmitted from the planetary gear device 24 to the differential device 18 through the counter shaft 34, and is distributed to front right and left wheels 20R, 20L by the differential device 18. Between the crank shaft 26 as an output shaft of the engine 12 and the transaxle casing 50 as a non-rotary member, a one-way clutch F0 is provided to allow rotation of the engine 12 in forward direction and inhibit rotation of the engine 12 in reverse direction. Further, a mechanical oil pump 30 is connected to the input shaft 22.

The second driving portion 16 is provided with a second rotary machine MG2 that serves as the drive force source as well as the engine 12. Although the second rotary machine MG2 may be an electric motor, the second rotary machine MG2 is preferably a motor/generator that serves as either an electric motor or a generator. The second rotary machine MG2 is disposed within the transaxle casing 50 such that a motor shaft 42 of the second rotary machine MG2 is parallel to the input shaft 22 of the first driving portion 14. A second output gear 44 is disposed on the motor shaft 42 of the second rotary machine MG2, and meshes with the large diameter gear 36 disposed on the counter shaft 34, so that the drive force of the second rotary machine MG2 is transmitted to the differential device 18 through the counter shaft 34, and is distributed to the front right and left wheels 20R, 20L by the differential device 18.

The transaxle 10 includes the above-described transaxle casing 50 storing therein the above-described rotary machines MG1, MG2, oil pump 30 and various gears. The transaxle casing 50 is integrally fixed to the engine 12, and is constituted by three casing members consisting of a first casing member 52, a second casing member 54 and a rear cover member 56. The first casing member 52, second casing member 54 and rear cover member 56 are fastened to one another through a multiplicity of fastener bolts 60, 62 such that openings of the three casing members 52, 54, 56 are opposed to one another in an axial direction (that is parallel to the above-described input shaft 22, counter shaft 34 and motor shaft 42). Thus, the first casing member 52, second casing member 54 and rear cover member 56 are integrally connected to one another, so as to cooperate with one another to constitute the transaxle casing 50. Further, the first casing member 52 is integrally fixed to the engine 12 through a multiplicity of fastener bolts 64.

Figure 11:
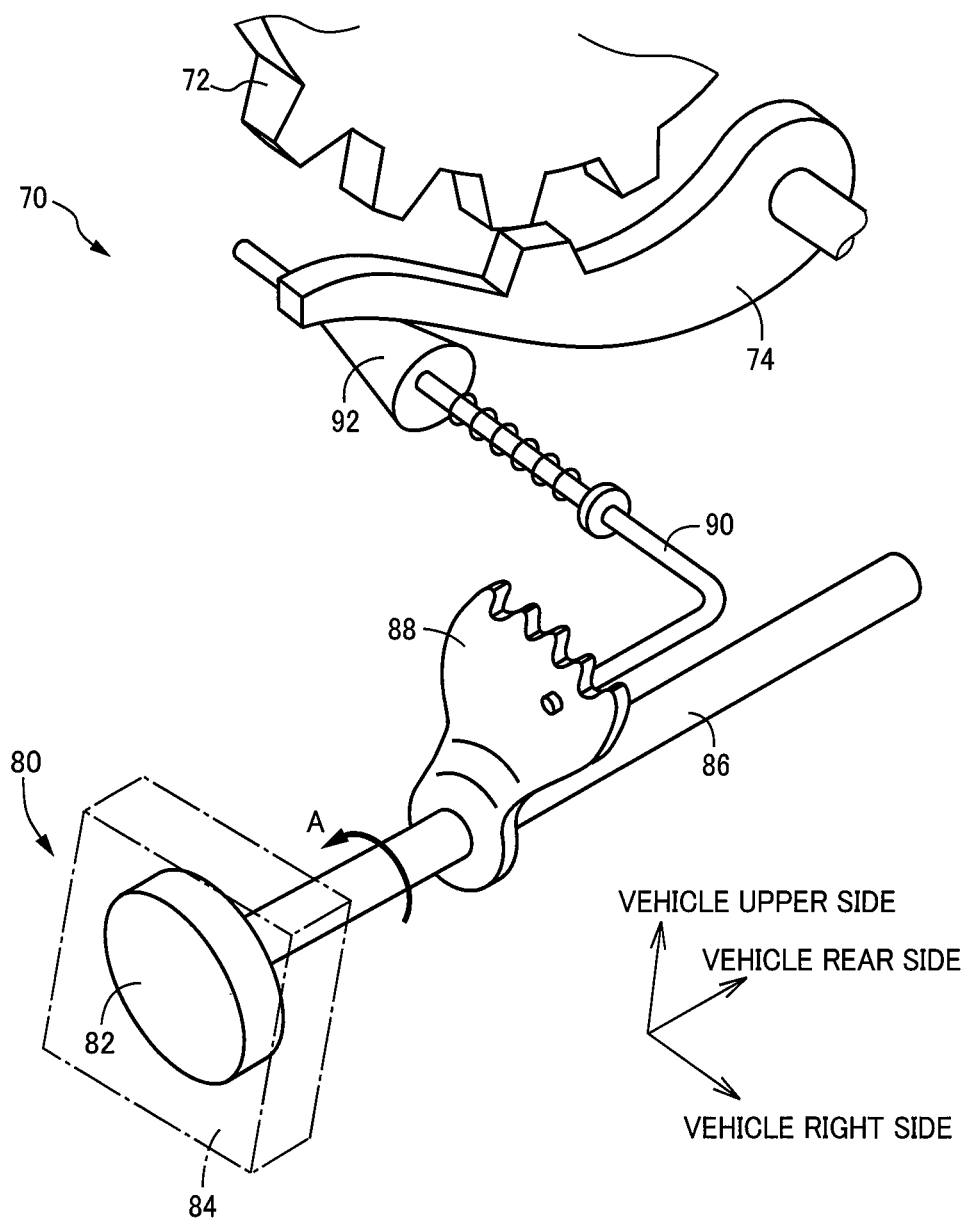
FIG. 11 is a schematic perspective view for explaining an example of a parking lock mechanism provided in the transaxle.

Further, the transaxle 10 is provided with a parking lock mechanism 70 of SBW (Shift-By-Wire) system, which is shown by way of example in FIG. 11. The parking lock mechanism 70 is configured to cause a locking pawl 74 to mesh with a parking gear 72 that is provided integrally with the above-described first output gear 32, so as to mechanically lock the output gear 32, counter shaft 34 and front wheels 20R, 20L, such that the lock the output gear 32, counter shaft 34 and front wheels 20R, 20L become unrotatable when being locked by the parking lock mechanism 70. The parking lock mechanism 70 includes an actuator device 80 by which the locking pawl 74 is to be pivoted. It is noted that the first output gear 32, which is fixed to the parking gear 72 and which is mechanically inhibited by the parking lock mechanism 70 from being rotated, corresponds to "drive-force transmitting member" recited in the appended claims.

The actuator device 80 is configured to electrically actuate the parking lock mechanism 70 in accordance with a parking lock command based on operation of a shift lever or the like, and includes an electric actuator 82 and a SBW-ECU (electronic control device) (not shown) configured to control operation of the electric actuator 82. These electric actuator 82, SBW-ECU and other components are stored in an actuator casing 84 that is constituted by a relatively rigid casing member. The electric actuator 82 is an electric motor. When a rotary shaft 86 is rotated through a motor shaft of the electric actuator 82 about its axis in direction indicated by arrow A in FIG. 11, a L-shaped parking rod 90 is driven through a detent plate 88, whereby the locking pawl 74 is pivoted through a tapered member 92 in a direction that causes the locking pawl 74 to be brought into meshing engagement with the parking gear 72.

Figure 3:
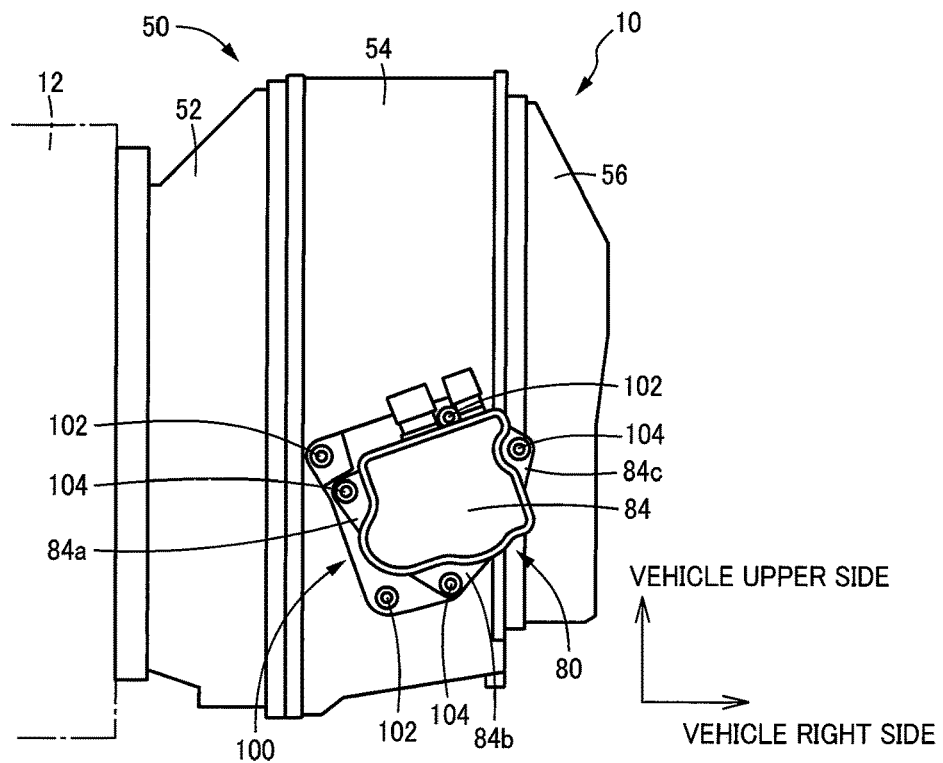
FIG. 3 is a schematic front view of the transaxle of FIG. 1 as seen from a front side of the vehicle.
Figure 4:
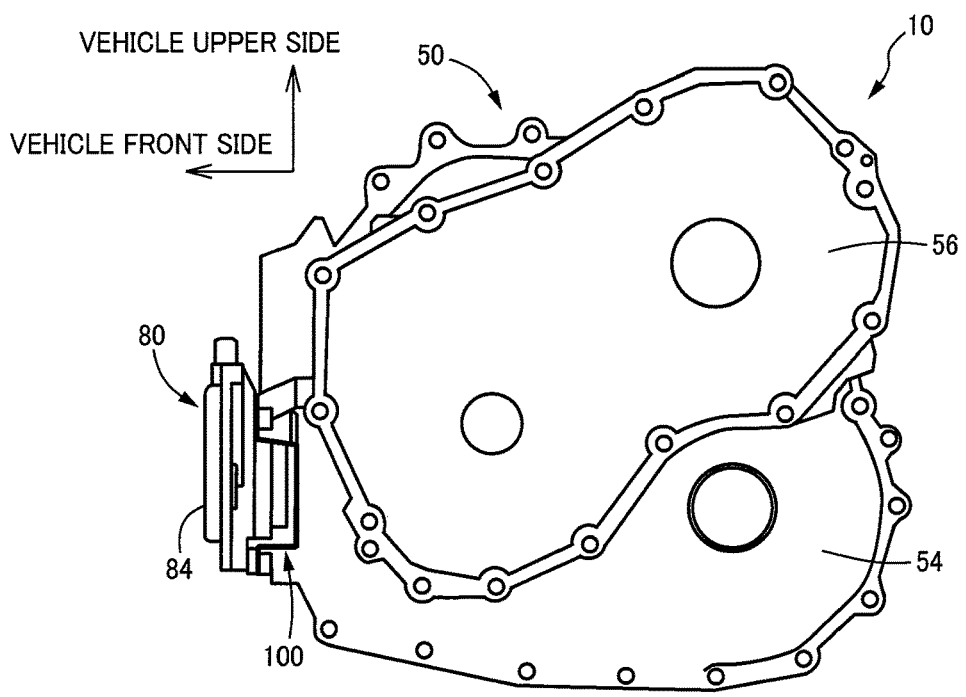
FIG. 4 is a schematic side view of the transaxle as seen from a right side of FIG. 3.

The transaxle casing 50 stores therein, in addition to the drive-force transmission mechanism 11, other portions of the parking lock mechanism 70 which are other than the actuator device 80 and which include the above-described rotary shaft 86, detent plate 88, L-shaped parking rod 90, tapered member 92 and locking pawl 74 that are to be moved together with one another. The actuator device 80 is located outside the transaxle casing 50, and is attached to the transaxle casing 50. That is, with the actuator device 80 being attached to the transaxle casing 50, the motor shaft of the electric actuator 82 is connected to the rotary shaft 86 through, for example, a spline engagement, so as to be unrotatable relative to the rotary shaft 86. FIG. 3 is a schematic front view of the transaxle 10 as seen from the front side of the vehicle 2. FIG. 4 is a schematic side view of the transaxle 10 as seen from a right side of FIG. 3. The actuator device 80 is attached to the transaxle casing 50 such that the actuator device 80 protrudes toward the front side of the vehicle 2 from an offset position which is located in a vehicle-front side portion of the transaxle casing 50 and which is offset in the right direction, i.e., the same direction as the above-described offset direction in which the width-wise offset position of the transaxle 10 is offset from the widthwise center of the vehicle 2. In the present embodiment, the transaxle 10 corresponds to "drive-force transmission unit" recited in the appended claims, the transaxle casing 50 corresponds to "casing (included in the drive-force transmission unit)" recited in the appended claims, and the actuator device 80 corresponds to "component (attached to the casing)" recited in the appended claims.

The actuator device 80 is attached to the transaxle casing 50 through a bracket 100 that corresponds to "attachment member" recited in the appended claims. The bracket 100 is integrally fixed to the second casing member 54 of the transaxle casing 50 through three fixture bolts 102 such that the bracket 100 is located in a substantially central portion of the transaxle casing 50 in the vehicle width direction. Meanwhile, the actuator device 80 is integrally fixed to the bracket 100 through three fixture bolts 104 such that the actuator device 80 is located in the offset position that is offset in the right direction from a center of the transaxle casing 50 in the vehicle width direction. The bracket 100 is constituted by a single piece made of a metallic material such as aluminum casting, and is formed to have a shape by casting, die-casting or pressing process.

Figure 5:
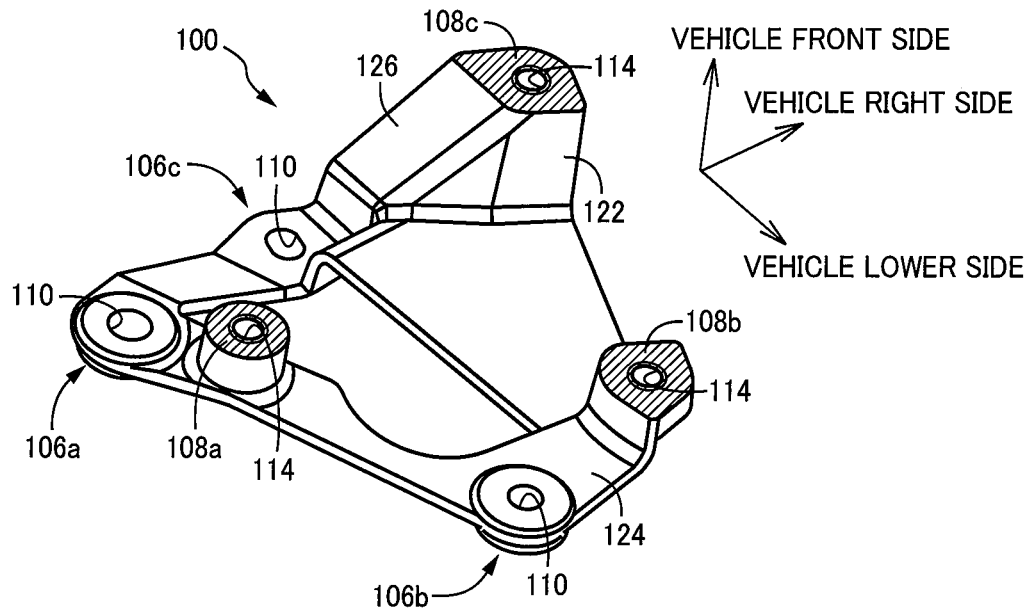
FIG. 5 is a perspective view individually showing a bracket through which an actuator device is attached to the transaxle.
Figure 6:
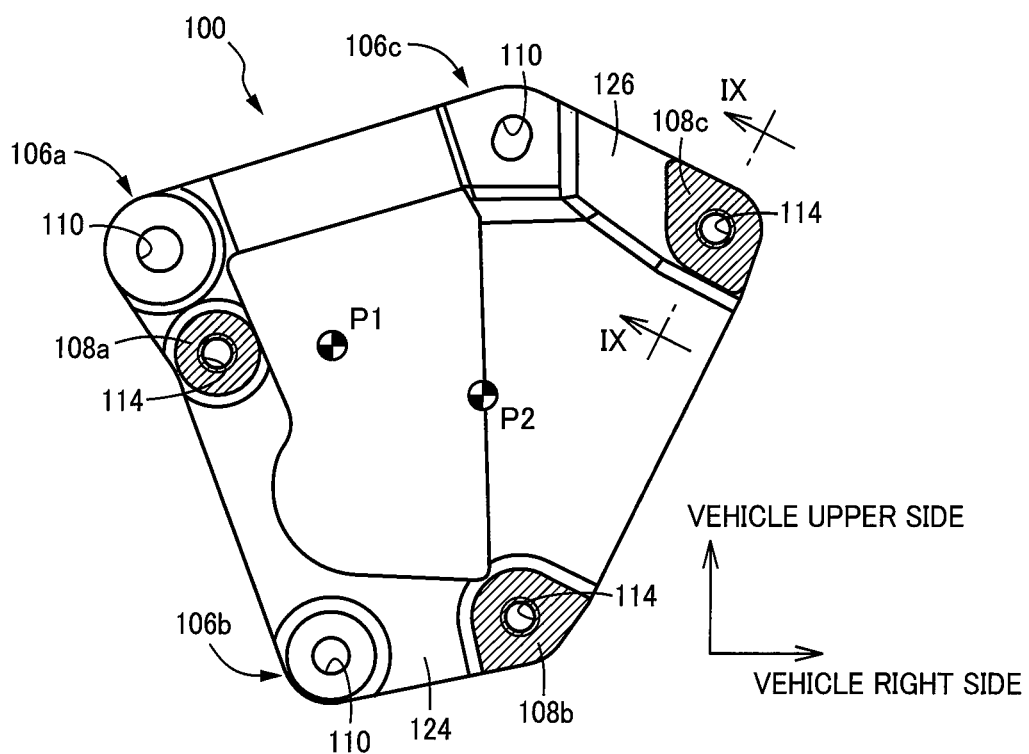
FIG. 6 a front view of the bracket of FIG. 5 in an installed state (in which the bracket is installed in the vehicle), as seen from the front side of the vehicle, namely, as seen from a side from which the actuator device is attached to the bracket.
Figure 7:
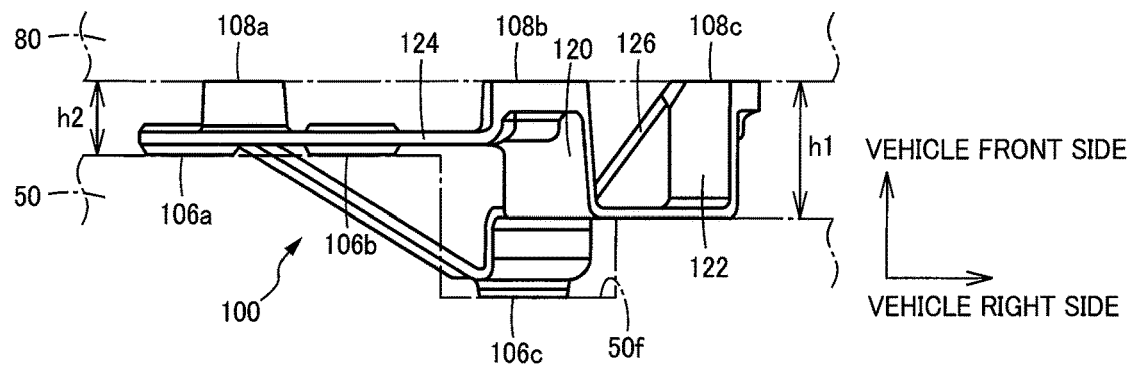
FIG. 7 is a bottom view of the bracket as seen from a lower side of FIG. 6.
Figure 8:
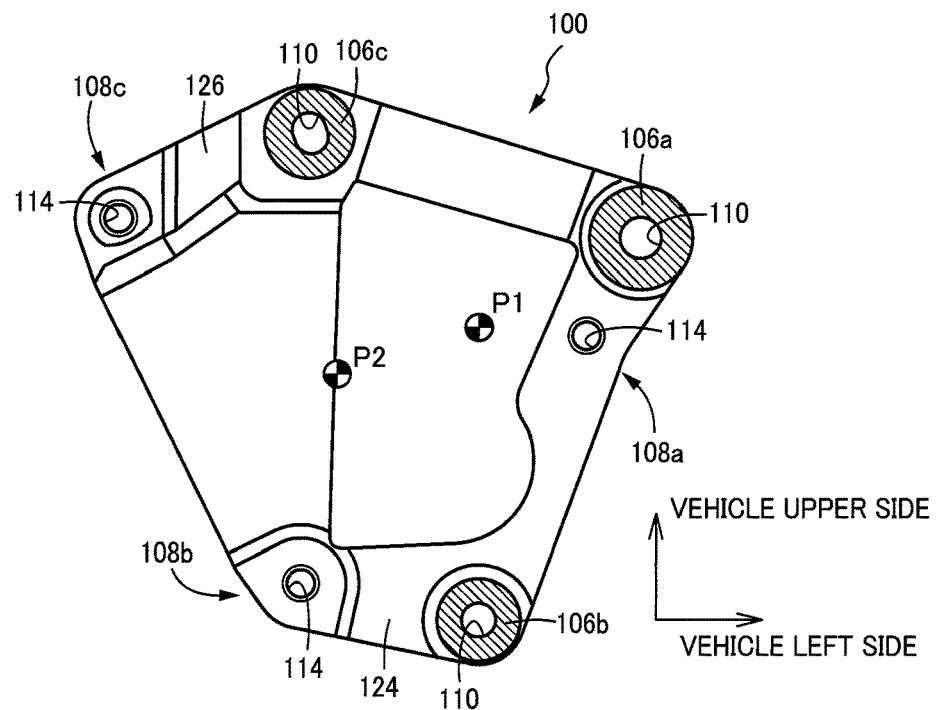
FIG. 8 is a rear view of the bracket as seen from a reverse side of FIG. 6, namely, as seen from a rear side of the vehicle from which the transaxle is fixed to the bracket.
Figure 9:
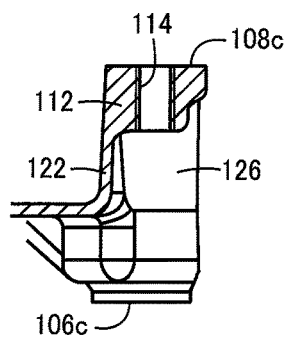
FIG. 9 is a cross sectional view taken along line IX-IX indicated in FIG. 6.

FIG. 5 is a perspective view individually showing the bracket 100. FIG. 6 a front view of the bracket of FIG. 5 in an installed state (in which the bracket 100 is installed in the vehicle 2), as seen from the front side of the vehicle 2, namely, as seen from a side from which the actuator device 80 is attached to the bracket 100. That is, the front view of FIG. 6 as well as the front view of FIG. 3 is a view seen from the front side of the vehicle 2. FIG. 7 is a bottom view of the bracket 100 as seen from a lower side of FIG. 6. FIG. 8 is a rear view of the bracket 100 as seen from a reverse side of drawing sheet of FIG. 6, namely, as seen from a rear side of the vehicle 2 from which the transaxle casing 50 is fixed to the bracket 100. FIG. 9 is a cross sectional view taken along line IX-IX indicated in FIG. 6. As shown in these FIGS. 5-9, the bracket 100 includes three fixed portions 106a, 106b, 106c at which the bracket 100 is fixed to the transaxle casing 50 through the three fixture bolts 102, and three attached portions 108a, 108b, 108c to which the actuator device 80 is attached to the bracket 100 through the three fixture bolts 104. A center P1 of the three fixed portions 106a, 106b, 106c is substantially coincident with a center of the transaxle 10 in the vehicle width direction. A center P2 of the three attached portions 108a, 108b, 108c is offset in the right direction of the vehicle 2 from the center P1, namely, from the center of the transaxle 10 in the vehicle width direction. The center P2 of the three attached portions 108a, 108b, 108c is substantially the same as a center of gravity of the actuator device 80. Therefore, since the center P2 is offset in the right direction from the center of the transaxle 10, an attached position (i.e., center of gravity) of the actuator device 80 is also offset in the right direction from the center of the transaxle 10 in the vehicle width direction. It is noted that the center P1 is an intersection of medians of a triangle whose vertexes correspond to the respective fixed portions 106a, 106b, 106c, and that the center P2 is an intersection of medians of a triangle whose vertexes correspond to the respective attached portions 108a, 108b, 108c.

In FIG. 8, three hatched areas represent flat seat surfaces of the respective fixed portions 106a, 106b, 106c of the bracket 100. All of these flat seat surfaces are opposed to the rear side of the vehicle 2. In the present embodiment, these flat seat surfaces are substantially perpendicular to a longitudinal direction of the vehicle 2 (hereinafter referred to as "vehicle longitudinal direction"). The bracket 100 is integrally fixed to the second casing member 54 through the fixture bolts 102, with these fixed portions 106a, 106b, 106c being in close contact with a substantially perpendicular front-side surface 50f (see FIG. 7) of the transaxle casing 50, more specifically, with the front-side surface 50f of the second casing member 54. The fixed portions 106a, 106b, 106c are provided with through-holes 110 through which the fixture bolts 102 are to be introduced. The front-side surface 50f of the transaxle casing 50 is a stepped surface having steps. The three fixed portions 106a, 106b, 106c are located in respective positions that are offset from one another, as needed, in the vehicle longitudinal direction, such that the fixed portions 106a, 106b, 106c are in close contact with the front-side surface 50f irrespective of presence of the steps. In the present embodiment, the fixed portions 106a, 106b are located in substantially the same position in the vehicle longitudinal direction, and the fixed portions 106c is located on a rear side of the fixed portions 106a, 106b in the vehicle longitudinal direction, namely, on a lower side of the fixed portions 106a, 106b as seen in FIG. 7.

In FIG. 5 and FIG. 6, three hatched areas represent flat seat surfaces of the respective attached portions 108a, 108b, 108c of the bracket 100. All of these flat seat surfaces are opposed to the front side of the vehicle 2. In the present embodiment, these flat seat surfaces are substantially perpendicular to the vehicle longitudinal direction. As is apparent from FIG. 7, these flat seat surfaces of the respective attached portions 108a, 108b, 108c lie on a common flat surface. The actuator device 80 is integrally fixed to the attached portions 108a, 108b, 108c of the bracket 100 through the fixture bolts 104, with the actuator casing 84 being in close contact with the flat seat surfaces of the respective attached portions 108a, 108b, 108c. The actuator casing 84 includes flat flanges 84a, 84b, 84c protruding outwardly (see FIG. 3), and is fixed at the flat flanges 84a, 84b, 84c to the attached portions 108a, 108b, 108c of the bracket 100 through the fixture bolts 104. As is apparent from FIG. 9 showing a cross section of the attached portion 108c, the attached portion 108c is provided with a thick portion 112 in which a threaded hole 114 is formed. The threaded hole 114 receives therein the fixture bolt 104 that is in thread engagement with the threaded hole 114. Although not being shown in the drawings, each of the other attached portions 108a, 108b as well as the attached portion 108c is provided with the thick portion 112 defining the threaded hole 114 with which the fixture bolt 104 is in thread engagement. It is noted that each of the attached portions 108a, 108b, 108c may be provided with a nut that is fixed therein by welding or the like, in place of provision of the thick portion 112 defining the threaded hole 114.

Among the above-described three attached portions 108a, 108b, 108c, the attached portions 108b, 108c (hereinafter referred to as "offset-side attached portions 108b, 108c") are located on a front side of the above-described center P2 of the three attached portions 108a, 108b, 108c in the right direction, i.e., in the offset direction (in which the widthwise offset position of the transaxle 10 is offset from the widthwise center of the vehicle 2), and the attached portion 108a (hereinafter referred to as "opposite-side attached portion 108a") is located on a rear side of the center P2 in the offset direction, namely, is located on a front side of the center P2 in the left direction, i.e., in a direction opposite to the offset direction. The bracket 100 is constructed such that each of the offset-side attached portions 108b, 108c is displaceable toward the rear side of the vehicle 2, easier than the opposite-side attached portion 108a. As shown in FIG. 7, the offset-side attached portions 108b, 108c of the bracket 100 is distant from the front-side surface 50f of the transaxle casing 50 by a distance h1 (corresponding to "first distance" in the appended claims) in the vehicle longitudinal direction, and the opposite-side attached portion 108a of the bracket 100 is distant from the front-side surface 50f of the transaxle casing 50 by a distance h2 (corresponding to "second distance" in the appended claims) in the vehicle longitudinal direction. The distance h1 is larger than the distance h2 whereby the offset-side attached portions 108b, 108c of the bracket 100 are permitted to be displaced toward the rear side of the vehicle 2 by a distance larger than the opposite-side attached portion 108a. It is noted that the offset-side attached portions 108b, 108c correspond to "at least one first attached portion" recited in the appended claims and that the opposite-side attached portion 108a corresponds to "at least one second attached portion" recited in the appended claims.

Figure 2:
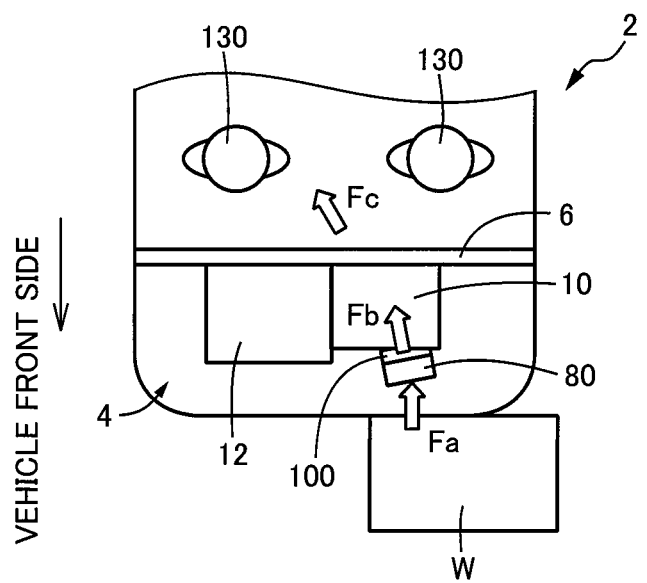
FIG. 2 is a schematic upper plan view for explaining a load applied to each component of the vehicle of FIG. 1 in the event of an offset collision of the vehicle.

The bracket 100 includes protruding support portions 120, 122 protruding toward the front side of the vehicle 2, and the offset-side attached portions 108b, 108c are provided in distal end portions of the respective protruding support portions 120, 122. Each of the protruding support portions 120, 122 has a rigidity and a shape (such as length, width and thickness) that are determined such that, upon application of an impact load Fa (i.e., external force) to the actuator device 80 from the front side of the vehicle 2, the protruding support portions 120, 122 are deformed (e.g., buckled) or broken whereby each of the offset-side attached portions 108b, 108c is displaced toward the rear side of the vehicle 2 by a distance larger than the opposite-side attached portion 108a. Therefore, when the impact load Fa is applied to the actuator device 80 from the front side of the vehicle 2, an attitude of the actuator device 80 attached to the bracket 100 is changed such that a right-side region portion of the actuator device 80 is displaced toward the rear side of the vehicle 2 whereby the actuator device 80 is brought into contact at its one end portion with the transaxle 10, as shown in FIG. 2. Consequently, a transmission load Fb, which acts in a direction inclined toward the left direction that is opposite to the above-described offset direction (i.e., right direction), namely, in a direction including a component of the left direction, is applied to the transaxle 10. The protruding support portions 120, 122 serve to constitute a displacement adjustment portion that is configured to facilitate the offset-side attached portions 108b, 108c to be displaced toward the rear side of the vehicle 2, more than the opposite-side attached portion 108a.

The bracket 100 further includes cantilever support portions 124, 126 extending in the right direction, i.e., in the offset direction in which the widthwise offset position of the transaxle 10 is offset from the widthwise center of the vehicle 2. The offset-side attached portions 108b, 108c are provided in distal end portions of the respective cantilever support portions 124, 126. Each of the cantilever support portions 124, 126 has a rigidity and a shape (such as length, width and thickness) that are determined such that, upon application of the impact load Fa (i.e., external force) to the actuator device 80 from the front side of the vehicle 2, the cantilever support portions 124, 126 are deformed (e.g., bent) or broken whereby each of the offset-side attached portions 108b, 108c is displaced toward the rear side of the vehicle 2 by the distance larger than the opposite-side attached portion 108a. Therefore, when the impact load Fa is applied to the actuator device 80 from the front side of the vehicle 2, the attitude of the actuator device 80 attached to the bracket 100 is changed such that the right-side region portion of the actuator device 80 is displaced toward the rear side of the vehicle 2 whereby the actuator device 80 is brought into contact at its one end portion with the transaxle 10, as shown in FIG. 2, so that the transmission load Fb, which acts in the direction inclined toward the left direction that is opposite to the above-described offset direction, namely, in the direction including a component of the left direction, is applied to the transaxle 10. The cantilever support portions 124, 126, as well as the protruding support portions 120, 122, serve to constitute the displacement adjustment portion that is configured to facilitate the offset-side attached portions 108b, 108c to be displaced toward the rear side of the vehicle 2, more than the opposite-side attached portion 108a. The actuator casing 84 has a higher rigidity against the impact load Fa applied from the front side of the vehicle 2, as compared with a rigidity of the protruding support portions 120, 122 and the cantilever support portions 124, 126 that cooperate to support the offset-side attached portions 108b, 108c, so that the offset-side attached portions 108b, 108c are displaced toward the rear side of the vehicle 2 before the actuator casing 84 is deformed or damaged. The bracket 100 includes opposite end portions that are opposite to each other in the vehicle width direction, such that one of the opposite end portions is located on a front side of the other of the opposite end portions in the offset direction, such that, upon the application of the impact load Fa the actuator device 80 from the front side of the vehicle 2, the bracket 100 is to be compressively deformed in the vehicle longitudinal direction by a larger amount in the above-described one of the opposite end portions, than in the other of the opposite end portions.

Further, the actuator device 80 has an opposed surface which is opposed to the front-side surface 50a of the transaxle casing 50 and is distant from the front-side surface 50a in the vehicle longitudinal direction, wherein the opposed surface of the actuator device 80 and the front-side surface 50a have respective overlapping portions that overlap with the bracket 100 in the vehicle longitudinal direction. Each of the overlapping portions has opposite end portions that are opposite to each other in the vehicle width direction, such that one of the opposite end portions is located on a front side of the other of the opposite end portions in the offset direction, wherein a distance between the overlapping portions in the vehicle longitudinal direction is larger in the one of the opposite end portions, than in the other of the opposite end portions.

The cantilever support portion 126 extends in the right direction of the vehicle 2 and also protrudes toward the front side of the vehicle 2, namely, extends in a direction including a component of the right direction of the vehicle 2 and a component of a front direction of the vehicle 2, so as to support the offset-side attached portion 108c. Thus, in view of this, the cantilever support portion 126 can be regarded also as protruding support portion as well as the protruding support portions 120, 122. Further, although the offset-side attached portions 108b, 108c are supported by the protruding support portions 120, 122 and the cantilever support portions 124, 126 in the present embodiment, the offset-side attached portions 108b, 108c may be supported by either only protruding support portions 120, 122 or only the cantilever support portions 124, 126 as long as a sufficient rigidity supporting the offset-side attached portions 108b, 108c can be established.

Figure 12:
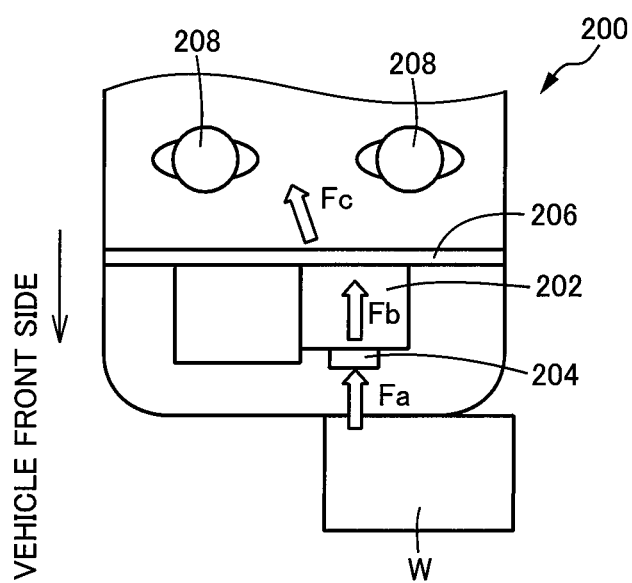
FIG. 12 is a schematic upper plan view for explaining a load applied to each component of a conventional vehicle in the event of an offset collision of the vehicle.

As described above, in the vehicle 2 according to the present embodiment, the actuator device 80 is attached to the transaxle casing 50 through the bracket 100, and the bracket 100 is provided with the protruding support portions 120, 122 and the cantilever support portions 124, 126 cooperating to each other to constitute the displacement adjustment portion that is configured to facilitate the right-side region portion of the actuator device 80 to be displaced toward the rear side of the vehicle 2, more than left-side region portion of the actuator device 80. Therefore, in the event of an offset collision in which the impact load Fa is applied to a right-side portion of the vehicle 2 (which is located on a front side of a left-side portion of the vehicle 2 in the above-described offset direction in which the widthwise offset position of the transaxle 10 is offset from the widthwise center of the vehicle 2), as shown in FIG. 2, the right-side region portion of the actuator device 80 is displaced toward the rear side of the vehicle 2 by a larger distance than the left-side region portion of the actuator device 80, namely, each of the offset-side attached portions 108b, 108c of the bracket 100 is displaced toward the rear side of the vehicle 2 by a larger distance than the opposite-side attached portion 108a of the bracket 100, as a result of deformation or breakage of the displacement adjustment portion (that is constituted by the protruding support portions 120, 122 and the cantilever support portions 124, 126). Thus, the attitude of the actuator device 80 is changed such that the right-side region portion of the actuator device 80 is displaced toward the rear side of the vehicle 2, and the actuator device 80 is brought into contact at its one end portion with the transaxle 10, whereby the transmission load Fb, which acts in the direction inclined toward the left side of the vehicle 2, is applied to the transaxle 10. Consequently, the pressing load Fc acting in the direction that is inclined toward the opposite direction more than in the conventional vehicle 200 that is shown in FIG. 12, is applied to the vehicle 2. Owing to application of the pressing load Fc acting in the direction more inclined toward the opposite direction, the vehicle 2 is laterally moved more appropriately in the direction away from the collision object W, it is possible to further alleviate the impact applied to the vehicle 2 and accordingly to increase safety of the passengers 130 of the vehicle 2. It is noted that the right-side region portion of the actuator device 80 corresponds to "first region portion (of the component)" recited in the appended claims, and that the left-side region portion of the actuator device 80 correspond to "second region portion (of the component)" recited in the appended claims.

Further, the offset-side attached portions 108b, 108c of the bracket 100 is facilitated, by the shapes of the protruding support portions 120, 122 and the cantilever support portions 124, 126 constituting the displacement adjustment portion of the bracket 100, to be appropriately displaced toward the rear side of the vehicle, more than the opposite-side attached portion 108a of the actuator device 80, as a result of deformations or breakages of the protruding support portions 120, 122 and the cantilever support portions 124, 126, whereby the attitude of the actuator device 80 is changed to appropriately alleviate the impact applied to the vehicle 2 and accordingly to increase the safety. Further, since the bracket 100 including the protruding support portions 120, 122 and the cantilever support portions 124, 126 that serve as the displacement adjustment portion, is constituted by a single piece made of a metallic material, the bracket 100 can be made compact in size and light in weight at a low cost.

Further, the plurality of attached portions 108a, 108b, 108c of the bracket 100 include the opposite-side attached portion 108a and the offset-side attached portions 108b, 108c that are located in the front side of the opposite-side attached portion 108a in the above-described offset direction, wherein the offset-side attached portions 108b, 108c are facilitated, by the displacement adjustment portion constituted by the protruding support portions 120, 122 and the cantilever support portions 124, 126, to be displaced toward the rear side of the vehicle 2, more than the opposite-side attached portion 108a, so that the attitude of the actuator device 80 is appropriately changed such that the right-side region portion of the actuator device 80 (which is located on the front side of the left-side region portion of the actuator device 80 in the above-described in the offset direction) is displaced toward the rear side of the vehicle 2, as a result of the displacements of the offset-side attached portions 108b, 108c of the bracket 100 which are caused by deformation or breakage of the displacement adjustment portion that are constituted by the protruding support portions 120, 122 and the cantilever support portions 124, 126.

Further, the first distance h1 between each of the offset-side attached portions 108b, 108c of the bracket 100 and the transaxle casing 50 in the vehicle longitudinal direction is larger than the second distance h2 between the opposite-side attached portion 108a of the bracket 100 and the transaxle casing 50 in the vehicle longitudinal direction, so that the offset-side attached portions 108b, 108c can be appropriately displaced toward the rear side of the vehicle 2 by a distance larger than the opposite-side attached portion 108a.

Further, the bracket 100 is provided with the plate-shaped protruding support portions 120, 122 protruding toward the front side of the vehicle 2, and the offset-side attached portions 108b, 108c are provided in the distal end portions of the respective protruding support portions 120, 122, so that each of the offset-side attached portions 108b, 108c can be appropriately displaced toward the rear side of the vehicle 2 by a distance larger than the opposite-side attached portion 108a, owing to, for example, deformations (e.g., buckling) and breakages of the protruding support portions 120, 122.

Further, the bracket 100 is provided with the cantilever support portions 124, 126 extending in the right direction of the vehicle 2, i.e., in the offset direction in which the widthwise offset position of the transaxle 10 is offset from the widthwise center of the vehicle 2, and the offset-side attached portions 108b, 108c are provided in the distal end portions of the respective cantilever support portions 124, 126, so that each of the offset-side attached portions 108b, 108c can be appropriately displaced toward the rear side of the vehicle 2 by a distance larger than the opposite-side attached portion 108a, owing to, for example, deformations (e.g., bending) and breakages of the cantilever support portions 124, 126.

Further, the center P2 of the plurality of attached portions 108a, 108b, 108c is located on a front side of the center P1 of the plurality of fixed portions 106a, 106b, 106c in the above-described offset direction in which the widthwise offset position of the transaxle 10 is offset from the widthwise center of the vehicle 2, so that the actuator device 80 is supported by the bracket 100 in an unstable manner. Therefore, upon application of the impact load Fa to the actuator device 80 from the front side of the vehicle 2, the offset-side attached portions 108b, 108c can be appropriately displaced toward the rear side of the vehicle 2, owing to, for example, deformation and/or breakage of the bracket 100.

Further, the actuator device 80 is attached to the transaxle casing 50 of through the bracket 100 such that the actuator device 80 is located in the offset position relative to the transaxle 10, wherein the offset position is offset from the center of the transaxle 10 in the above-described offset direction, so that the transmission load Fb applied to the transaxle 10 is inclined more toward the left direction of the vehicle 2, owing to the offset location of the actuator device 80 relative to the transaxle 10 in addition to the change of the attitude of the actuator device 80 caused by, for example, deformation of the bracket 100. Therefore, the pressing load Fc applied to the vehicle 2 from the transaxle 10 is inclined more toward the left direction of the vehicle 2, whereby the impact acting on the vehicle 2 can be further appropriately alleviated and accordingly the safety can be further increased.

Further, in the present embodiment, the drive-force transmission unit is the transaxle 10, and the actuator device 80 of the parking lock mechanism 70 is the component that is attached to the transaxle casing 50 through the bracket 100. In the event of the offset collision, for example, the attitude of the actuator device 80 is changed owing to, for example, deformation of the bracket 100, so that it is possible to appropriately provide technical advantages that the impact acting on the vehicle 2 can be alleviated and accordingly the safety can be increased.

While the preferred embodiment of this invention has been described in detail by reference to the drawings, it is to be understood that the embodiment described above is given for illustrative purpose only, and that the present invention may be embodied with various modifications and improvements which may occur to those skilled in the art.

NOMENCLATURE OF ELEMENTS

2: vehicle
10: transaxle (drive-force transmission unit)

11: drive-force transmission mechanism
18: differential device
32: first output gear (drive-force transmitting member)
50: transaxle casing (casing)
70: parking lock mechanism
80: actuator device (component)
100: bracket (attachment member)
106a, 106b, 106c: fixed portions
108a: attached portion (second attached portion)
108b, 108c: attached portions (first attached portion)
120, 122: protruding support portions (displacement adjustment portion)
124, 126: cantilever support portions (displacement adjustment portion)
P1: center of a plurality of fixed portions
P2: center of a plurality of attached portions
h1, h2: distances
Fa: impact load

What is claimed is:

1. A vehicle comprising:
a drive-force transmission mechanism;
a drive-force transmission unit including a casing storing therein the drive-force transmission mechanism, the drive-force transmission unit being installed in a widthwise offset position which is located in a front portion of the vehicle and which is offset from a widthwise center of the vehicle in an offset direction that is one of right and left directions of the vehicle;
a component disposed on a front side of the casing in a longitudinal direction of the vehicle and protruding away from the casing toward a front side of the vehicle, the component including first and second region portions that are opposite to each other in a width direction of the vehicle such that the first region portion is located on a front side of the second region portion in the offset direction; and
an attachment member through which the component is attached to a vehicle-front side portion of the casing,
wherein the attachment member is provided with a displacement adjustment portion that is configured, upon application of an external force to the component from the front side of the vehicle, to facilitate the first region portion of the component to be displaced toward a rear side of the vehicle, more than the second region portion of the component.

2. The vehicle according to claim 1,
wherein the attachment member is a single piece made of a metallic material, and
wherein the displacement adjustment portion of the attachment member has a shape that facilitates the first region portion of the component to be displaced toward the rear side of the vehicle, more than the second region portion of the component, upon the application of the external force to the component from the front side of the vehicle.

3. The vehicle according to claim 1,
wherein the attachment member includes at least one fixed portion at which the attachment member is fixed to the casing,
wherein the attachment member includes a plurality of attached portions to which the component is attached,
wherein the plurality of attached portions include at least one first attached portion and at least one second attached portion such that the at least one first attached portion is located on a front side of the at least one second attached portion in the offset direction, and wherein the at least one first attached portion is facilitated, by the displacement adjustment portion, to be displaced toward the rear side of the vehicle, more than the at least one second attached portion, upon the application of the external force to the component from the front side of the vehicle.

4. The vehicle according to claim 3,
wherein each of the at least one first attached portion of the attachment member is distant from the casing of the drive-force transmission unit by a first distance in the longitudinal direction of the vehicle, and each of the at least one second attached portion of the attachment member is distant from the casing of the drive-force transmission unit by a second distance in the longitudinal direction of the vehicle, and
wherein the first distance is larger than the second distance, whereby the at least one first attached portion is permitted to be displaced toward the rear side of the vehicle by a distance larger than the at least one second attached portion, upon the application of the external force to the component from the front side of the vehicle.

5. The vehicle according to claim 3,
wherein the attachment member includes at least one protruding support portion having a plate-like shape and protruding toward the front side of the vehicle,
wherein each of the at least one first attached portion is provided in a distal end portion of a corresponding one of the at least one protruding support portion, and
wherein the at least one protruding support portion constitutes at least a part of the displacement adjustment portion of the attachment member.

6. The vehicle according to claim 3,
wherein the attachment member includes at least one cantilever support portion extending in the offset direction,
wherein each of the at least one first attached portion is provided in a distal end portion of a corresponding one of the at least one cantilever support portion, and
wherein the at least one cantilever support portion constitutes at least a part of the displacement adjustment portion of the attachment member.

7. The vehicle according to claim 3,
wherein the at least one fixed portion of the attachment member consists of a plurality of fixed portions, and
wherein a center of the plurality of attached portions is located on a front side of a center of the plurality of fixed portions in the offset direction.

8. The vehicle according to claim 1,
wherein the component is attached to the casing of the drive-force transmission unit through the attachment member such that the component is located in an offset position relative to the drive-force transmission unit, the offset position being offset from a center of the drive-force transmission unit in the offset direction.

9. The vehicle according to claim 1,
wherein the drive-force transmission unit is a transaxle which is disposed to be adjacent to a drive force source in the width direction of the vehicle, the transaxle being provided with, as at least a part of the drive-force transmission mechanism, a differential device configured to distribute a drive force transmitted from the drive force source, into right and left wheels of the vehicle, and
wherein the component is an actuator device configured to electrically actuate a parking lock mechanism for mechanically inhibiting rotation of a drive-force transmitting member that constitutes at least a part of the drive-force transmission mechanism.

10. The vehicle according to claim 1,
wherein the attachment member includes opposite end portions that are opposite to each other in the width direction of the vehicle, such that one of the opposite end portions is located on a front side of the other of the opposite end portions in the offset direction, and
wherein, upon the application of the external force to the component from the front side of the vehicle, the attachment member is to be compressively deformed in the longitudinal direction of the vehicle by a larger amount in the one of the opposite end portions, than in the other of the opposite end portions.

11. The vehicle according to claim 1,
wherein the component and the casing have respective surfaces that are opposed to each other and distant from each other in the longitudinal direction of the vehicle,
wherein the surfaces of the component and the casing have respective overlapping portions that overlap with the attachment member in the longitudinal direction of the vehicle,
wherein each of the overlapping portions of the surfaces of the component and the casing includes opposite end portions that are opposite to each other in the width direction of the vehicle, such that one of the opposite end portions is located on a front side of the other of the opposite end portions in the offset direction, and
wherein a distance between the overlapping portions in the longitudinal direction of the vehicle is larger in the one of the opposite end portions, than in the other of the opposite end portions.

12. The vehicle according to claim 11,
wherein the attachment member has a smaller rigidity against the external force applied to the component from the front side of the vehicle, than the casing.

* * * * *